Figure 1:
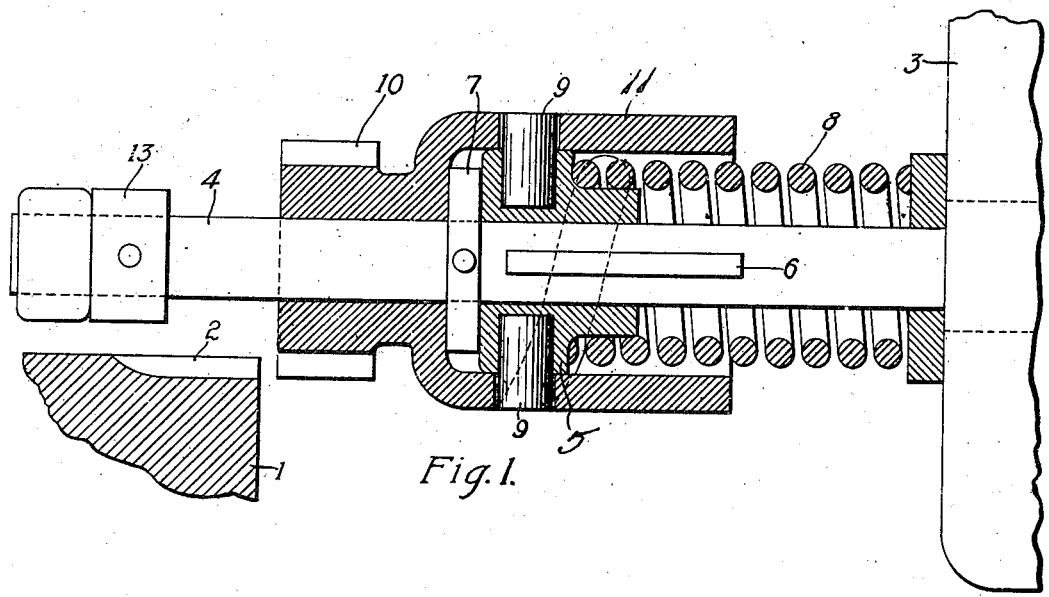

Oct. 28, 1924.

C. H. HODGKINS ET AL 1,513,244

STARTING MECHANISM FOR AUTOMOBILES

Filed Oct. 18, 1919

3 Sheets-Sheet 1

WITNESSES:
H. J. Shelhamer
J. R. Langley.

INVENTORS
Charles H. Hodgkins &
Carl H. Kindl
BY
Wesley G. Carr
ATTORNEY

Oct. 28, 1924.

C. H. HODGKINS ET AL 1,513,244

STARTING MECHANISM FOR AUTOMOBILES

Filed Oct. 18, 1919  3 Sheets-Sheet 2

WITNESSES:
H. J. Shelhamer
J. R. Langley

INVENTORS
Charles H. Hodgkins &
Carl H. Kindl
BY
Wesley G. Carr
ATTORNEY

Oct. 28, 1924.

C. H. HODGKINS ET AL 1,513,244

STARTING MECHANISM FOR AUTOMOBILES

Filed Oct. 13, 1919    3 Sheets-Sheet 3

INVENTORS
Charles H. Hodgkins &
Carl H. Kindl
BY
ATTORNEY

Patented Oct. 28, 1924.

1,513,244

UNITED STATES PATENT OFFICE.

CHARLES H. HODGKINS AND CARL H. KINDL, OF PITTSBURGH, PENNSYLVANIA, ASSIGNORS TO WESTINGHOUSE ELECTRIC & MANUFACTURING COMPANY, A CORPORATION OF PENNSYLVANIA.

STARTING MECHANISM FOR AUTOMOBILES.

Application filed October 18, 1919. Serial No. 331,599.

*To all whom it may concern:*

Be it known that we, CHARLES H. HODGKINS, a subject of the King of Great Britain, and a resident of Pittsburgh, in the county of Allegheny and State of Pennsylvania, and CARL H. KINDL, a citizen of the United States, and a resident of Pittsburgh, in the county of Allegheny and State of Pennsylvania, have invented a new and useful Improvement in Starting Mechanisms for Automobiles, of which the following is a specification.

Our invention relates to starting mechanisms for automobiles and particularly to starting mechanisms of the type embodying a gear wheel that is automatically actuated into mesh with another gear wheel upon the operation of a starting motor and is actuated out of mesh with the other gear wheel upon the starting of the engine.

One object of our invention is to provide an arrangement whereby the meshing of two relatively movable gear wheels may be effected without shock and without damage to the teeth of the gear wheels.

Another object of our invention is to provide a mechanism for operatively connecting a starting motor to a rotatable engine member without the employment of a yielding connection directly between the driving and the driven parts.

A further object of our invention is to provide means whereby, upon the end-to-end engagement of the teeth of relatively movable gear wheels, they may be yieldingly maintained in such relation until sufficient relative angular movement has occurred to permit their meshing.

In the operation of starting devices of the type comprising means for automatically shifting a pinion into and out of engagement with the fly wheel gear of an internal-combustion engine, it frequently occurs that the teeth of the flywheel gear are damaged as a result of the impacts incident to the forcible meshing of the gear teeth. Such results are particularly frequent with starting devices embodying a screw-threaded shaft for shifting the pinion longitudinally of the shaft upon the operation of the motor.

It has been found necessary, in devices of the character mentioned above, to provide a yielding connection between the motor and the pinion in order that the latter shall not bear a rigid relation to the motor shaft at the instant of initial engagement of the respective gear teeth and thus cause excessive damage to the gear teeth upon the meshing of the pinion with the flywheel gear, in case the teeth do not register perfectly.

A yielding driving connection is necessary in starting mechanisms of the screw-threaded type because it frequently occurs that the pinion is only partially actuated into mesh with the flywheel gear. If the force of the motor is suddenly applied to the pinion to crank the engine, it may happen that one or more of the teeth are broken.

Another disadvantage in the operation of screw-threaded starting devices is the employment of relatively movable parts having engaging surfaces of uniform pitch or inclination to the axis of the shaft. This arrangement does not permit the rate of endwise movement of the pinion to be varied during the meshing of the gear teeth. Such variation has been found to be desirable in order to effect the smooth acceleration and retardation of the pinion at the respective ends of its path of movement.

Considerable difficulty has been experienced, also, in maintaining the pinion in meshed relation with the flywheel during the operation of cranking the engine. It is well known that internal-combustion engines have points of high compression during a revolution of the crank shaft, corresponding, in number, to the cylinders of the engine. When the engine is approaching one of the compression points, considerable power is required to rotate the shaft. Upon passing one of the compression points, the engine tends to rotate faster and the result is similar to that in case the engine starts, in that the pinion is actuated at such speed as to effect its automatic disengagement.

In accordance with our invention, we provide an arrangement by means of which we are enabled to avoid the difficulties referred to above. A pinion, which is loosely mounted on the armature shaft of an electric motor, is adapted to be actuated into mesh with the flywheel gear of an internal-combustion engine upon the rotation of the motor and to be shifted out of mesh with the flywheel gear upon the starting of the engine. A member, which is slidably keyed to the armature shaft for rotation therewith, has a pin-and-slot connection to the pinion, the slots being inclined with respect to the axis of the shaft. The angle of inclination of the slots is not uniform as is that of a screw-thread of the conventional helical form.

A spring normally retains the slidable member in one position on the shaft. The spring permits the slidable member to recede along the shaft when the teeth of the pinion do not register properly with the teeth of the flywheel gear and the ends of the respective teeth engage during the shifting operation of the pinion toward the flywheel. The length of the slots are such that the pinion reaches the end of its path of movement slightly before the pins have reached the ends of the slots, and the spring operates as a buffer to insure that the motor initiates the rotation of the engine flywheel without shock.

Figure 2:
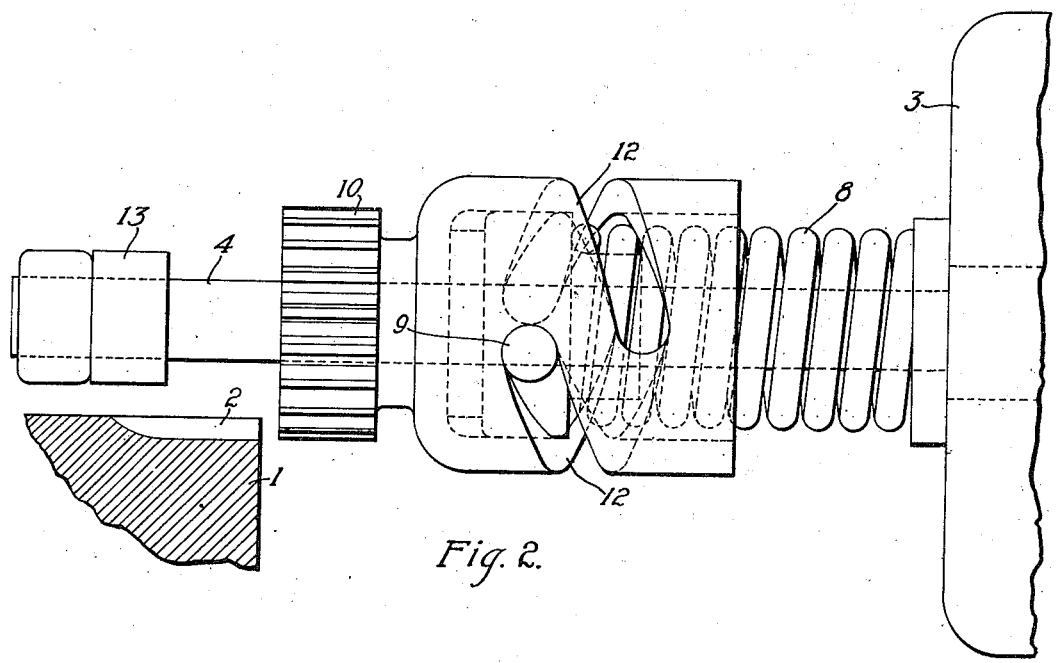
Figure 3:
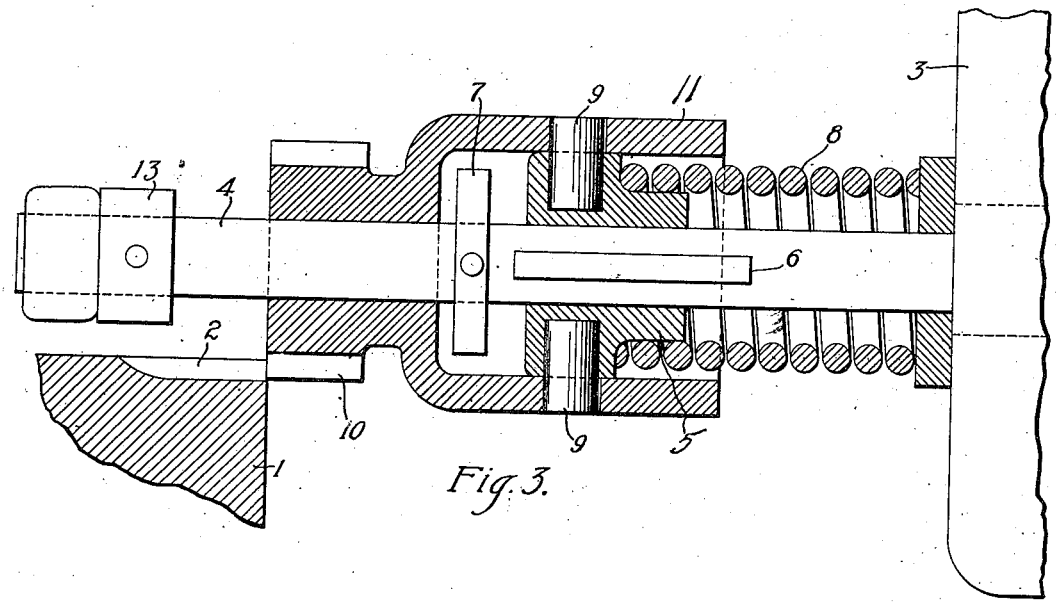
Figure 4:
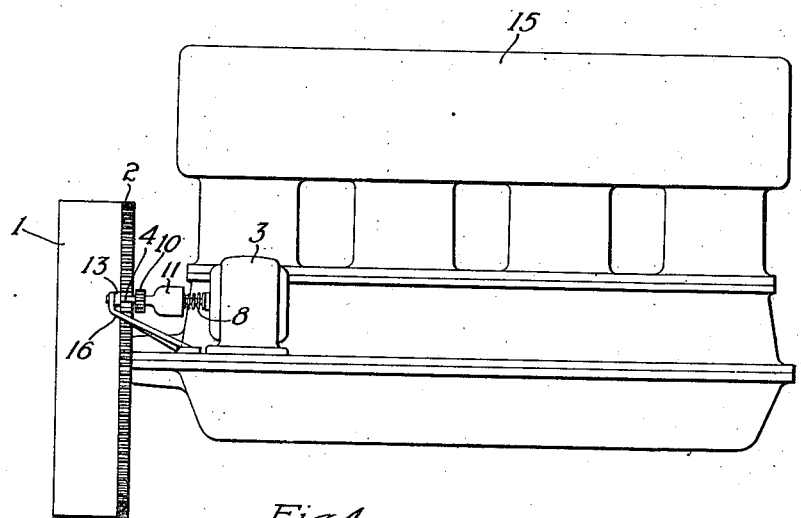
Figure 5:
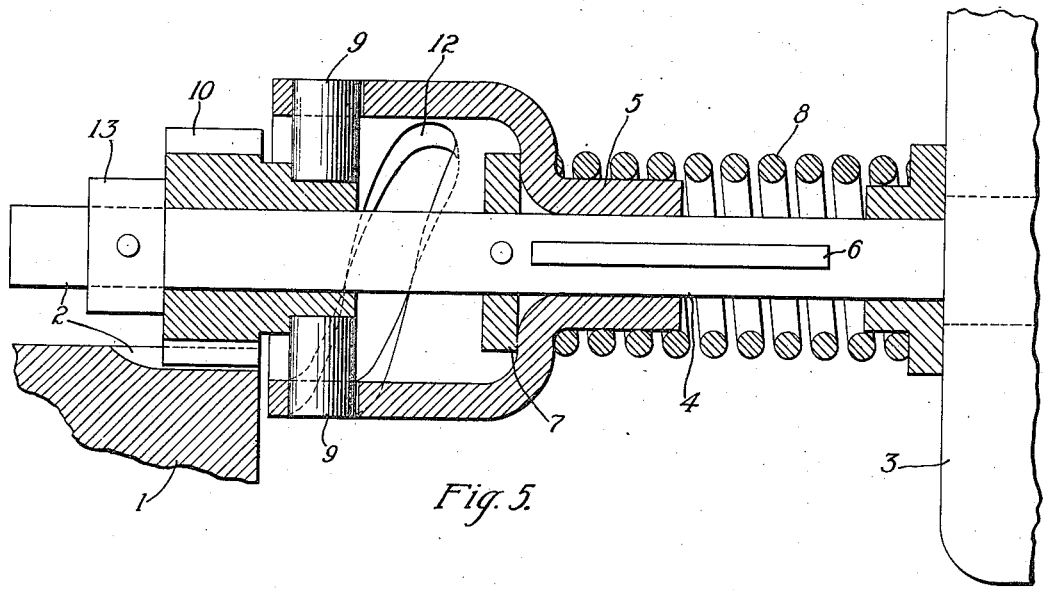
Figure 6:
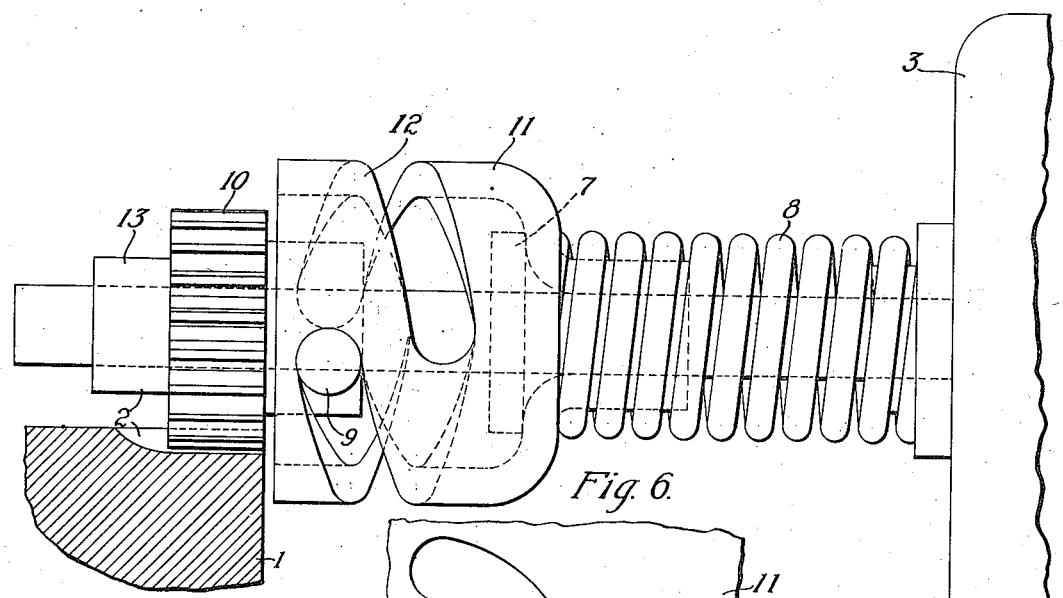
Figure 7:
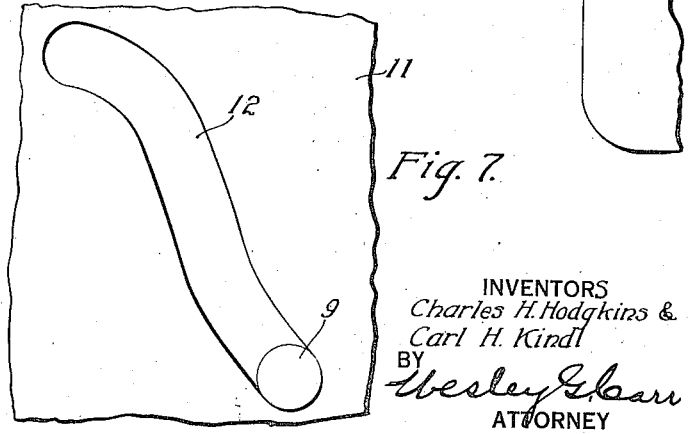

Reference may now be had to the accompanying drawings in which Fig. 1 is a view, in section, of a portion of an engine flywheel, with a starting mechanism applied thereto; Fig. 2 is a side view, in elevation, of the mechanism of Fig. 1; Fig. 3 is a view, similar to Fig. 1, illustrating the positions of the several parts when the ends of the gear teeth are in engagement; Fig. 4 is a side view, in elevation, of an internal-combustion engine with a starting mechanism applied thereto; Fig. 5 is a side view, in section, of a modification; Fig. 6 is a side view, in elevation, of the mechanism in Fig. 5; Fig. 7 is a view of a development of a slot of preferred form.

Referring particularly to Figs. 1 and 2, an engine flywheel 1, only a portion of which is shown, is provided with peripheral gear teeth 2. An electric motor 3, only a portion of which is shown, has an armature shaft 4 upon which is mounted a sleeve member 5. The sleeve member 5 is slidably keyed upon the armature shaft by means of a key 6. The sleeve member 5 is normally held in its illustrated position by a fixed collar 7 and a spring 8 which has a bearing against one end of the armature. The sleeve member 5 is provided with two radially extending cylindrical pins 9.

A pinion 10, which coacts with the flywheel gear 2, is loosely mounted on the armature shaft 4. The pinion 10 is integral with, or connected to, a cylindrical sleeve member 11 which surrounds the sleeve member 5 and is provided with two curved slots 12, the inclined surfaces of which coact with the pins 9. The inclination of the slots with respect to the axis of the shaft is varied at different portions of their lengths to vary the effect of the relative movements of the shaft and the pinion. For example, the slots 12 may take the form of compound curves, if the corresponding operating characteristics are desired. A slot of this character is illustrated in Fig. 7. A stop member 13 limits the outward movement of the pinion 10, its inward movement being limited by the collar member 7.

It may be assumed that the several parts occupy their respective positions in which they are illustrated. It may be assumed, further, that the circuit of the motor 3 has been closed by any suitable means (not shown). The armature shaft 4 is rotated rapidly in a clockwise direction, as viewed from the left, Figs. 1 and 2. The pinion 10 and the sleeve member 11, which are loosely mounted on the shaft, tend to remain stationary by reason of their inertia. The sleeve member 5 and the pins 9 rotate with the shaft 4. The pins act in the nature of cams upon the inclined surfaces of the slots 12 and, as a result, the sleeve member 11 and the pinion 10 are actuated longitudinally of the shaft toward the flywheel 1.

If the teeth of the respective gear wheels are in proper relation for meshing, the movement of the pinion 10 continues until the latter engages the stop member 13. At this point, the pins 9 have not reached the opposite ends of the respective slots 12 and they tend to actuate the pinion 10 farther to the left. Since further axial movement of the pinion 10 is not possible by reason of its engagement with the stop member 13, the relative angular movement of the pins 9 and sleeve member 11 causes the sleeve member 5 to be actuated to the right to place the spring 8 under compression. The spring 8 operates, therefore, as a buffer to take up the shock incident to the motor driving the pinion 10 and, through it, the flywheel 1. The strength of the spring is so limited, however, that the sleeve member 5 is actuated to the right until the pins 9 engage the ends of the slots 12 to complete a rigid driving connection between the motor and the pinion 10.

During the operation of cranking the motor, the pinion remains fully in mesh with the flywheel gear. When the engine accelerates in passing over the several points of compression, the sleeve member 11 and the pins 9 maintain approximately their relative positions corresponding to those shown in the mechanism of Figs. 5 and 6. The tendency of the flywheel to cause the automatic disengagement of the pinion is counteracted by the energy stored in the spring 8, since the latter is under compression as described above. Such relative movement of the parts as may occur is between the pins 9 and the sleeve member 11 and not between the pinion 10 and the flywheel gear 2.

When the engine starts under its own power, the flywheel gear 2 is driven at a comparatively high speed, and the pinion 10 is rotated faster than the armature shaft 4 and its connected parts. The result is to cause relative angular movement between the sleeve member 11 and the pins 9. The resulting cam action actuates the sleeve member 11 and the pinion 10 to the right, as viewed in Figs. 1 and 2, to effect disengagement of the pinion and the flywheel gear. The various parts then occupy their respective illustrated positions.

In case the teeth of the pinion do not register properly with the teeth of the flywheel gear when the pinion reaches the position in which it is shown in Fig. 3, the ends of the respective teeth engage to prevent further outward movement of the pinion. The motor 3 is rotating rapidly, however, and the pins 9 are exerting a considerable force tending to actuate the pinion to the left. The pins 9 tend, with an equal force, to actuate the sleeve member 5 to the right, as will be readily understood. The result is to cause the actuation of the sleeve member 5 to the right to thereby compress the spring 8. The sleeve member 11 and pinion 10 are also rotated by the pins 9 either simultaneously with, or immediately subsequent to, the compression of the spring 8.

When the pinion has rotated sufficiently to permit the meshing of the gear teeth, the latter action is effectively and quickly accomplished by the forces of the motor and the spring 8, in which energy was stored as described above. It will be appreciated that all of the operations described above occur within a very short period of time. The operation then proceeds in the manner previously described.

Reference may now be had to Fig. 4, in which an internal-combustion engine 15 is provided with a starting mechanism constructed in accordance with our invention. The starting motor 3 is mounted in any suitable manner upon the crank case of the engine. An outboard bearing for the armature shaft 4 is provided by a bracket 16.

A modification of our invention is illustrated in Figs. 5 and 6, similar numerals being employed to designate corresponding parts. The various parts are illustrated in the positions respectively occupied by them when the pinion is in mesh with the flywheel gear. The principal differences between the mechanism shown in the latter figures and that previously described consists in the mounting of the pins 9 upon the pinion 10, and the combination of the sleeve member 11 with the sleeve member 5. The sleeve member 11 rotates with the shaft to actuate the pins 9 and pinion 10 longitudinally of the shaft. The operation of the modified arrangement is otherwise substantially identical with that described above, and a detailed description thereof is omitted as being unnecessary to a complete understanding of the same.

The modified form of our invention possesses the advantage that the weight of the moving parts connected to the pinion is materially less than that of the parts connected to the pinion in the first arrangement. The reduction in the weight of the shiftable parts insures that the impact, incident to the meshing of the gear wheels and the operative engagement of the several parts, is materially less than that in connection with the operation of the first arrangement.

A development of a slot of preferred form is illustrated in Fig. 7. The slot 12 may be divided into three approximately equal portions which produce different effects upon movement of the pinion. This first or lower portion of the slot, as shown, is so inclined to the axis of the shaft that the pinion shall be actuated into mesh by a minimum number of revolutions of the motor shaft. This action occurs while the motor is accelerating, and it is desirable to effect maximum movement of the pinion before the motor has reached full speed. The pitch is, accordingly, relatively steep with respect to the axis of the shaft.

In the intermediate portion of the slot, the angle of inclination is smaller than that of the first portion. This angle is so arranged that the shocks incident to the inertia of the coacting parts are gradually absorbed. In the third or upper portion of the slot, the angle of inclination is increased. The slot is of such shape that the component of force exerted by the pin tending to rotate the sleeve and the connected pinion is increased and the component of force along the axis of the shaft tending to shift the pinion is correspondingly decreased. The result is to utilize the spring 8, to a maximum degree, as a buffer to absorb the impact of the pinion in its endwise movement.

In the return movement of the pinion, it is at first accelerated at a comparatively high rate, then actuated at an approximately uniform rate and finally withdrawn from mesh quickly by the coaction of the pins with the relatively steep sides of the lower portions of the pair of slots. The pinion is brought to rest when the pins reach the ends of the slots.

It will be noted that our improved starting mechanism possesses a number of advantages over the starting devices of the prior art. No damage is caused by the failure of the teeth of the respective gear wheels to register properly when the pinion is shifted toward the gear wheel. It is not necessary to employ a spring or other yielding driving connection. Such yielding connections possess the serious disadvantage that they are easily broken and that it is difficult to properly design springs for this service.

Another advantage is the elimination of internal screw threads in the pinion, thereby permitting the employment of a pinion of relatively small diameter. The gear ratio may, therefore, be correspondingly large, thus permitting the use of a comparatively small high-speed electric motor.

While we have shown and described specific embodiments of our invention, it is understood that changes in certain details may be desirable. For example, the inclined slots may be so designed as effect the smooth and gradual acceleration of the pinion in its movement toward the flywheel. The opposite sides of the slots may be of different shape and inclination to produce correspondingly different characteristics in the advance and the return movements of the pinion. The mechanism may be so arranged by obvious modification as to provide a device of the inboard type instead of the outboard type that has been shown and described.

We claim as our invention:

1. The combination with a shaft and a pinion, of a member movably mounted on said shaft but rotatable therewith, a second member having a pin-and-slot connection to the first member and operatively connected to said pinion and a spring coacting with one of said members, said slot being inclined to the axis of the shaft whereby relative movement of the pin in the slot operates to shift the pinion relatively to said shaft and then to place the spring under stress.

2. The combination with two gear wheels and a motor having a shaft, of a member slidably keyed upon said shaft for rotation therewith, a spring for normally maintaining said member in one position on said shaft, and a second member connected to one of said gear wheels, one of said members having a slot inclined to the axis of said shaft, the surfaces of said slot coacting with the other member to effect the meshing of said gear wheels upon the rotation of said motor.

3. The combination with two relatively movable gear wheels, and a motor having a shaft, one of said gear wheels being mounted directly on said shaft, of means for automatically effecting the meshing of said gear wheels upon the operation of said motor, said means comprising a member movable longitudinally relatively to said shaft, a second member at least partially surrounding the movable member, and having a pin-and-slot connection thereto, and a spring that is placed under stress by said longitudinally movable member when the ends of the respective teeth of said gear wheels are in engagement and when the gear wheels are completely meshed.

4. The combination with two relatively movable gear wheels, and a motor having a shaft, one of said gear wheels being mounted directly on said shaft, of means for automatically effecting the engagement and disengagement of said gear wheels, said means comprising two concentrically disposed members on said shaft that are movable angularly and longitudinally relatively to each other, one of said members being slidably keyed to said shaft and one of said members having surfaces inclined to said shaft for coacting with the other member to effect the axial movement of one of said gear wheels.

5. The combination with two relatively movable gear wheels, and a motor having a shaft, of means for shifting one of said gear wheels into and out of mesh with the other gear wheel, said means comprising a member of substantially bell shape on said shaft, said member being secured to one of said gear wheels and having an inclined slot, a second member within the first member and having a pin coacting with the surfaces of said slot, the last-named member being slidably keyed to said shaft and a spring that is placed under stress when said pin occupies a predetermined position in said slot.

6. The combination with two relatively movable gear wheels, and a motor having a shaft, of means for shifting one of said gear wheels into and out of mesh with the other gear wheel, said means comprising a member on said shaft having an inclined slot, a member having a pin for coacting with the surfaces of said slot, one of said members being slidably keyed to said shaft, and a spring that is placed under stress when said gear wheels are in certain relative positions and when said pin is within a predetermined portion of said slot.

7. The combination with two relatively movable gear wheels, and a motor having a shaft, of means for shifting one of said gear wheels into and out of mesh with the other gear wheel, said means comprising a member on said shaft having an inclined slot, a member having a pin for coacting with the surfaces of said slot, one of said members being slidably keyed to said shaft, and a spring that is placed under stress when the ends of the teeth of the respective gear wheels are in engagement and when the pin bears predetermined relation to said slot.

8. In a starter, a rotatable shaft, a pinion mounted thereon, a hollow cylindrical member connected to said pinion and provided with a helically extending slot, a member within said cylindrical member and having a pin for coacting with said slot, the last-named member being slidably keyed to said shaft, and a spring for biasing the last-named member to one position.

9. The combination with two relatively movable gear wheels and a motor having a shaft, of means for shifting one of said gear wheels into and out of mesh with the other gear wheel, said means comprising a member of substantially bell-shape on said shaft, a second member within the first member, one of said members being connected to one of said gear wheels, one of said members having an inclined slot and the other member having a pin for coacting with said slot, one of said members being slidably keyed to said shaft, and a spring for biasing the slidably keyed member to one position on said shaft.

10. The combination with a motor having a shaft and a pinion slidably mounted thereon for axial movement, of means for operatively connecting said pinion to said shaft comprising two concentrically disposed sleeve members having a pin-and-slot connection therebetween, said slot being inclined to the axis of said shaft, each of said sleeves being slidably mounted directly on said shaft, one of said sleeves being rotatable with said shaft, and means comprising a stop member and a spring for yieldingly maintaining one of said sleeves in a predetermined position on said shaft.

11. The combination with a motor having a shaft and a pinion slidably mounted thereon for axial movement, of means for operatively connecting said pinion to said shaft comprising two concentrically disposed sleeve members having a pin-and-slot connection therebetween, said slot being inclined to the axis of said shaft, each of said sleeves being slidably mounted on said shaft, one of said sleeves being rotatable with said shaft, a stop member between said sleeves, and a spring for yieldingly maintaining the inner sleeve against said stop member.

12. The combination with a motor having a shaft and a pinion slidably mounted thereon for axial movement, of means for operatively connecting said pinion to said shaft comprising two concentrically disposed sleeve members having a pin-and-slot connection therebetween, said slot being inclined to the axis of said shaft, each of said sleeves being slidably mounted on said shaft, one of said sleeves being rotatable with said shaft, a stop member enclosed by the outer sleeve, and a spring for yieldingly maintaining the inner sleeve against said stop member.

13. The combination with an engine member, a motor having a shaft and a driving member, of means for operatively connecting said driving member to said shaft comprising a tubular member and a sleeve member slidably keyed to said shaft within said tubular member and having connecting means therebetween whereby relative angular movement effects relative axial movement, a stop member between said tubular member and said sleeve member, and a spring for maintaining said sleeve member against said stop member.

14. The combination with a shaft and a pinion, of means for operatively connecting the shaft to said pinion comprising two members having a pin-and-slot connection and a spring coacting with one of said members, said slot being inclined to the axis of the shaft whereby relative movement of the pin in the slot operates first to actuate the pinion to its operative position and further relative movement of the pin and the slot operating to place said spring under stress.

In testimony whereof, we have hereunto subscribed our names this 16th day of Oct., 1919.

CHARLES H. HODGKINS.
CARL H. KINDL.